United States Patent
Bolis et al.

(10) Patent No.: US 11,550,163 B2
(45) Date of Patent: Jan. 10, 2023

(54) TUNABLE BLAZED GRATING

(71) Applicant: APPLE INC., Cupertino, CA (US)

(72) Inventors: Sebastien Bolis, Crolles (FR); Arnaud Pouydebasque, Varces-Allieres-et-Risset (FR); Nachiappan Chidambaram, Grenoble (FR)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/581,926

(22) Filed: Jan. 23, 2022

(65) Prior Publication Data
US 2022/0317468 A1  Oct. 6, 2022

Related U.S. Application Data

(60) Provisional application No. 63/170,609, filed on Apr. 5, 2021.

(51) Int. Cl.
*G02B 27/42* (2006.01)
*G02B 27/09* (2006.01)

(52) U.S. Cl.
CPC ..... *G02B 27/4244* (2013.01); *G02B 27/0944* (2013.01)

(58) Field of Classification Search
CPC .......................... G02B 27/0944; G02B 27/4244
See application file for complete search history.

(56) References Cited

U.S. PATENT DOCUMENTS

| | | |
|---|---|---|
| 6,834,142 B2 | 12/2004 | Bailey et al. |
| 7,920,330 B2 | 4/2011 | Aschwanden et al. |
| 8,674,689 B1 | 3/2014 | Nielson et al. |
| 9,733,402 B2 | 8/2017 | Liu et al. |
| 9,976,952 B2 | 5/2018 | Sriram et al. |
| 10,018,831 B2 | 7/2018 | Corbelli et al. |
| 2009/0238217 A1* | 9/2009 | Moser ............... H01S 5/141 372/20 |
| 2020/0379250 A1 | 12/2020 | Takashima et al. |
| 2021/0302659 A1* | 9/2021 | Lee ............... G02B 6/29395 |

FOREIGN PATENT DOCUMENTS

| | | |
|---|---|---|
| WO | 19999048197 A3 | 9/1999 |
| WO | 2020208380 A1 | 10/2020 |

OTHER PUBLICATIONS

Yu et al., "Tunable Optical Gratings Based o Buckled Nanoscale Thin Films on Transparent Elastomeric Substrates", Applied Physics Letters, vol. 96, pp. 1-3, year 2010.

(Continued)

*Primary Examiner* — Anne M Hines
(74) *Attorney, Agent, or Firm* — Kligler & Associates Patent Attorneys Ltd (57) ABSTRACT

Apparatus for deflection of a beam of light includes a case, which is configured to be positioned in a path of the beam, and a liquid, which is contained within the case. An array of plates is disposed across a surface of the liquid. The plates are configured to rotate on the surface about respective axes, which are mutually parallel and are spaced apart by a predefined pitch. An actuator is configured to drive a rotation of the plates about the respective axes so as deflect the beam that is incident on the plates.

20 Claims, 7 Drawing Sheets

(56) References Cited

OTHER PUBLICATIONS

Wong et al., "Analog Tunable Gratings Driven by Thin-Film Piezoelectric Microelectromechanical Actuators", Applied Optics, vol. 42, No. 4, pp. 621-626, Feb. 1, 2003.
Spremo et al., "Piezoelectric Diffraction-Based Optical Switches", NASA Tech Briefs, pp. 13-14, Nov. 2003.
Ji et al., "Soft Tunable Diffractive Optics with Multifunctional Transparent Electrodes Enabling Integrated Actuation", Applied Physics Letters, No. 3, vol. 109, pp. 1-7, year 2016.
Kowarz et al., "Conformal Grating ElectroMechanical System (GEMS) for High-Speed Digital Licht Modulation", Technical Digest of IEEE 15th International Conference on MEMS, pp. 568-573, year 2002.
Zhang et al., "MEMS Grating with Interdigitated-Comb Structure", Key Engineering Materials, vol. 503, pp. 49-54, year 2012.
Bernet et al., "Multi-Color Operation of Tunable Diffractive Lenses", Optics Express, vol. 25, issue 3, pp. 2469-2480, year 2017.
Kress, "Free-Space Micro-Optics," in "Field Guide to Digital Micro-Optics," SPIE Field Guides, vol. FG33, p. 11, year 2014.
O'Shea et al., "Diffractive Optics: Design, Fabrication and Test", SPIE Tutorial Texts in Optical Engineering, vol. TT62, pp. 66-72, SPIE Press, USA 2004.
Bolis et al., U.S. Appl. No. 17/228,740, filed Apr. 13, 2021.
Bolis et al., U.S. Appl. No. 17/581,928, filed Jan. 23, 2022.

\* cited by examiner

TUNABLE BLAZED GRATING

CROSS-REFERENCE TO RELATED APPLICATION

This application claims the benefit of U.S. Provisional Patent Application 63/170,609, filed Apr. 5, 2021, which is incorporated herein by reference.

FIELD OF THE INVENTION

The present invention relates generally to optical components, and particularly to tunable optical elements.

BACKGROUND

Diffractive optical elements (DOEs) are optical components with micro-structure patterns that modulate the phase of incident beams of optical radiation. (The term "optical radiation" is used in the present description and in the claims, interchangeably with the term "light," to refer to electromagnetic radiation in any of the visible, ultraviolet, and infrared spectral ranges.) DOEs may operate on either transmitted or reflected radiation (or both). The optical effect of the DOE depends on the spacing and depth of the diffractive micro-structure pattern.

A diffraction grating is a type of DOE with a periodic structure that diffracts incident light into multiple, distinct beams by either transmission through or reflection from the grating. The beams correspond to diffraction orders of the grating, which emanate from the grating at angles $\theta_m$ determined by the grating pitch d and the wavelength $\lambda$ of the incident light: $\theta_m = \sin^{-1}(m\lambda/d)$. The fraction of the incident optical power that is emitted into a given diffraction order is referred to as the efficiency of the grating for that order.

The efficiency of a grating for a particular order at a particular wavelength can be optimized by appropriate choice of the blaze angle $\theta_B$, which is defined as the angle between the facets of the grating and the surface plane of the grating. For example, in a transmission grating, when the blaze angle is chosen such that the angle at which the beam is refracted at the facets is equal to the diffraction angle of a particular diffraction order, the light will be diffracted into that order with high efficiency.

SUMMARY

Embodiments of the present invention that are described hereinbelow provide tunable diffraction gratings and methods for their manufacture and use.

There is therefore provided, in accordance with an embodiment of the invention, apparatus for deflection of a beam of light. The apparatus includes a case, which is configured to be positioned in a path of the beam, and a liquid, which is contained within the case. An array of plates is disposed across a surface of the liquid. The plates are configured to rotate on the surface about respective axes, which are mutually parallel and are spaced apart by a predefined pitch. An actuator is configured to drive a rotation of the plates about the respective axes so as deflect the beam that is incident on the plates.

In some embodiments, the case, the liquid, and the plates are transparent to the light, and the beam is deflected upon transmission through the apparatus. In one embodiment, the apparatus includes cylindrical microlenses, which are fixed to the case in alignment with the plates.

Additionally or alternatively, the beam is deflected by reflection from the plates.

In some embodiments, the array is configured to diffract the incident beam into a plurality of diffraction orders, having an angular spacing between the orders that is dependent on a ratio of a wavelength of the light to the pitch of the array, and the actuator is configured to rotate the plates among a set of two or more blaze angles selected to direct the deflected light respectively into two or more different ones of the diffraction orders. In a disclosed embodiment, the two or more of the diffraction orders include a zero diffraction order and a first diffraction order.

Additionally or alternatively, the liquid includes an oil. In one embodiment, the oil across which the plates are disposed is a first liquid having a first refractive index, and the apparatus further includes a second liquid, which is immiscible with the oil and has a second refractive index different from the first refractive index, and which is disposed within the case over the array of plates.

In some embodiments, the apparatus includes a flexible membrane covering the surface of the liquid, wherein the plates are disposed on the flexible membrane, which is deformed by the rotation of the plates. In a disclosed embodiment, the case includes a reservoir having a volume that varies with the rotation of the plates so as to receive and expel the liquid that is displaced by deformation of the flexible membrane. The apparatus may also include a pump, which is configured to draw the liquid into the reservoir and drive the liquid out of the reservoir in conjunction with the rotation of the plates.

In one embodiment, the axes about which the plates rotate are disposed along respective edges of the plates. In another embodiment, the axes about which the plates rotate are disposed along respective centerlines of the plates. Additionally or alternatively, the apparatus includes a plurality of hinges, which secure the plates to the case at points along the respective axes of the plates.

In some embodiments, the actuator includes a plurality of piezoelectric beams, which are coupled to apply rotational forces to the plates. In one embodiment, the piezoelectric beams are oriented along the respective axes of the plates. In another embodiment, the piezoelectric beams are oriented perpendicular to the respective axes of the plates.

In some embodiments, the array of plates includes a first array of the plates, which are disposed across a first surface of the liquid and are configured to rotate about respective first axes, and the apparatus includes a second array of the plates, which are disposed across a second surface of the liquid, opposite the first surface, and are configured to rotate about respective second axes, which are mutually parallel. In a disclosed embodiment, the second axes are parallel to the first axes. In another embodiment, the second axes are perpendicular to the first axes.

Methods for producing apparatus as described above and methods for deflecting a beam of light as implemented in the apparatus described above are also within the scope of the present invention.

The present invention will be more fully understood from the following detailed description of the embodiments thereof, taken together with the drawings in which:

DETAILED DESCRIPTION OF EMBODIMENTS

A wide variety of beam deflection and scanning devices are known in the art. In general, as the required deflection angle grows, the size and energy consumption of the device increases concomitantly. There is a need for ultra-compact, power-efficient devices that can rapidly switch or scan an incident beam of light between two or more different output angles.

Embodiments of the present invention that are described herein address this need by providing beam deflection apparatus with a novel, liquid-based structure. In the disclosed embodiments, the liquid is contained in a case, and an array of plates is disposed across the surface of the liquid in the container. (In some embodiments, the plates are disposed on a flexible membrane, which covers the surface of the liquid.) The plates rotate on the surface of the liquid about respective axes, which are mutually parallel and are spaced apart by a predefined pitch. An actuator drives the rotation of the plates about the respective axes so as to deflect a beam of light that is incident on the plates. The incident beam may be directed to reflect from the plates or to be refracted at the surface of the plates as it is transmitted through the apparatus (assuming that the case, liquid, and plates are all transparent at the wavelength of the beam). Because the apparatus uses an array of plates on a liquid substrate, only minimal energy is expended in rotating the plates, and little or no free space is required above the surface of the liquid to accommodate the rotation.

The pitch of the plates is selected in accordance with application requirements. In embodiments in which the pitch is substantially larger than the wavelength of the incident beam, the apparatus deflects the beam continuously by reflection or refraction at the surfaces of the plates. On the other hand, for smaller values of pitch (for example, below about 100 times the wavelength), the array of plates functions as a diffraction grating, diffracting the incident beam into multiple diffraction orders with an angular spacing between the orders that is dependent on the ratio of the wavelength to the pitch. In such embodiments, the actuator rotates the plates among a set of two or more blaze angles, which efficiently direct the deflected light into different diffraction orders. By appropriate selection of the blaze angles, the apparatus can serve as a switchable blazed grating over a large range of wavelengths.

Figure 1:
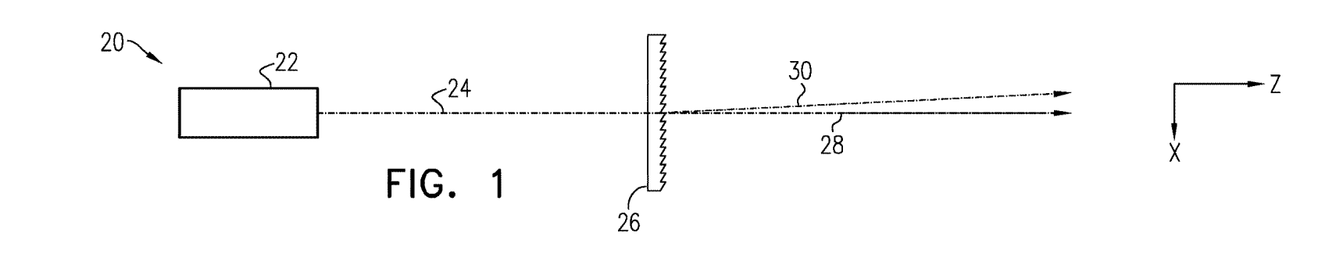
FIG. 1 is schematic side view of apparatus for optical beam steering, in accordance with an embodiment of the invention.

FIG. 1 is schematic side view of apparatus 20 for optical beam steering, in accordance with an embodiment of the invention. Apparatus 20 comprises a light source, such as a laser 22, which emits a beam 24 of light along a direction that is identified, for the sake of convenience, as the Z-axis in this and subsequent figures. Beam 24 is incident on a deflection device 26, which is configured in this embodiment as a diffraction grating operating in a transmission mode. Device 26 diffracts beam 24 into two or more diffraction orders, which include, in this embodiment, a zero order 28 and a first order 30. Actuators in device 26 control the blaze angle of the grating in order to direct the light in beam 24 selectively into one of the diffraction orders, as described below in greater detail.

In the pictured embodiment, deflection device 26 operates as a transmission grating. In other embodiments, deflection device 26 has a larger pitch, relative to the wavelength of beam 24, and operates as an adjustable prism, which deflects the beam by refraction. In alternative embodiments (not shown in the figures), the beam is deflected by reflection from device 26. Depending again on the pitch, the device may operate either as a reflection grating or as a rotating mirror array.

Figure 2A:
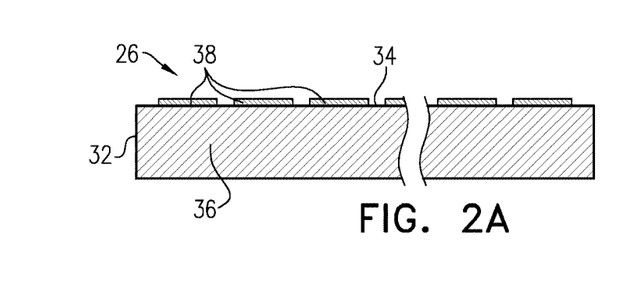
FIGS. 2A and 2B are schematic sectional views of a tunable diffraction grating at two different blaze angles, in accordance with an embodiment of the invention.
Figure 2B:
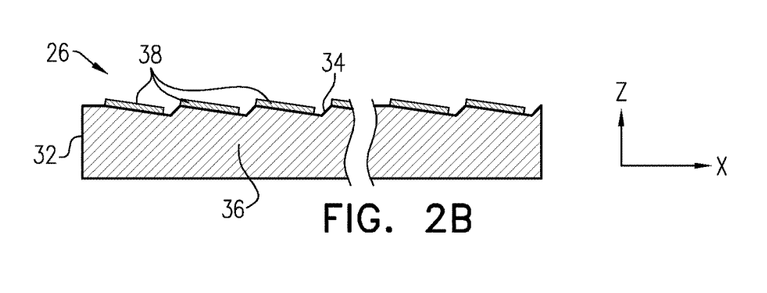
Figure 2C:
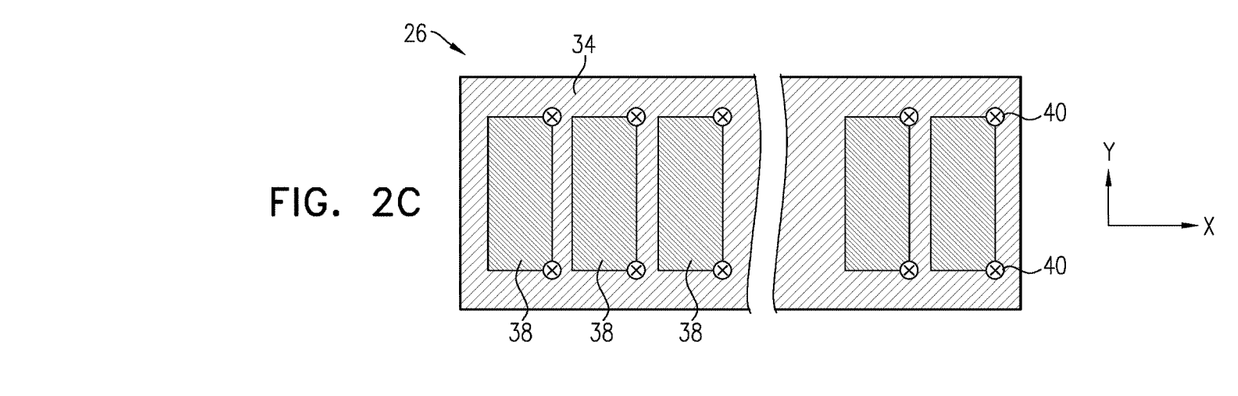
FIG. 2C is a schematic frontal view of the tunable diffraction grating of FIGS. 2A and 2B.

Reference is now made to FIGS. 2A-2C, which schematically show details of deflection device 26, which is configured as a tunable diffraction grating in accordance with an embodiment of the invention. FIGS. 2A and 2B are sectional views at two different blaze angles of the grating, while FIG. 2C is a frontal view.

Device 26 comprises a case 32, which is positioned in the path of beam 24 (FIG. 1). The case is filled with a liquid 36, which is covered by a flexible membrane 34. An array of plates 38 is fixed to the surface of membrane 34, extending across the surface of liquid 36. As illustrated in FIGS. 2A and 2B, plates 38 rotate on the surface about respective axes, which are mutually parallel and are spaced apart by a predefined pitch. A number of different axis configurations are shown in the figures that follow. In these and the subsequent figures, the axes of plates 38 are assumed to extend along the Y-axis, and the pitch corresponds to the distance, measured along the X-axis, between the axes of neighboring plates. Although membrane 34 and plates 38 are disposed only across one side of case 32 in the present embodiment, in alternative embodiments (as shown in FIGS. 14 and 15A-C), there may be membranes and arrays of plates on both sides of the case.

As device 26 operates in transmission mode, case 32, liquid 36, membrane 34, and plates 38 are all transparent to the light in beam 24. For this purpose, case 32 and plates 38 typically comprise a suitable rigid glass or polymer material, and membrane 34 comprises a thin, flexible polymer or inorganic material. Alternatively, for operation at infrared wavelengths, plates 38 and/or case 32 may comprise suitable semiconductor materials, such as silicon. Assuming the wavelength of beam 24 to be approximately 1 µm, plates 38 will be between about 1 µm and 100 µm wide in the X-direction. To achieve a high fill factor and thus high efficiency of deflection, the pitch of the array is typically only slightly larger than the width of the plates.

Membrane 34 may comprise, for example, a siloxane-based polymer, polymethyl methacrylate (PMMA), or any other polymer with appropriate optical properties (for example, high optical transmittance, inter alia), low Young's Modulus, and stable residual stress. Alternatively, membrane 34 may comprise inorganic materials, such as $SiO_2$ or SiN. The thickness of polymer membranes used in the present embodiments is typically in the range of a few microns up to several tens of microns. The thickness of inorganic membranes in these embodiments is typically in the range of a few tens of nanometers up to several hundred nanometers. Membrane 34 may alternatively comprise a combination of polymer and inorganic materials.

Liquid 36 may include any suitable transparent liquid, desirably with a high refractive index to promote refraction in the configuration of FIG. 2B. Optical oils perform well in this capacity, such as silicone, phenyl-based, or perfluoro-polyether oils. Nanoparticles may be added to the oil in order to further increase its refractive index.

One or more actuators (shown in the figures that follow) drive the rotation of plates 38 about the respective axes so as deflect the beam that is incident on the plates. In the present example, the angles of plates 38 in FIGS. 2A and 2B correspond to different grating blaze angles that are selected to optimize diffraction into the zero and first diffraction orders, respectively (orders 28 and 30 in FIG. 1). FIG. 2A shows the rest position of the plates, while FIG. 2B shows the actuated position. (Although for the sake of simplicity of illustration, the representation of membrane 34 in FIG. 2B, as well as in the figures that follow, has sharp transitions between plates 38, in practice the membrane bends smoothly in response to the pressure exerted by the plates.) In one embodiment, the actuators apply downward pressure at points 40 along the edges of plates 38. Alternatively, the actuators may apply uniform downward pressure along the lengths of the edges of the plates. Additionally or alternatively, the actuators may apply upward pressure at certain points or along the edges of the plates, possibly in conjunction with downward pressure on the opposite edges of the plates. As yet another alternative, the actuators may apply a rotational moment directly along the axes of rotation of the plates.

In the pictured embodiments, the actuators rotate all the plates concurrently at the same angle. Alternatively, the actuators may be controlled to rotate certain plates selectively, at the same or different angles.

Figure 3:
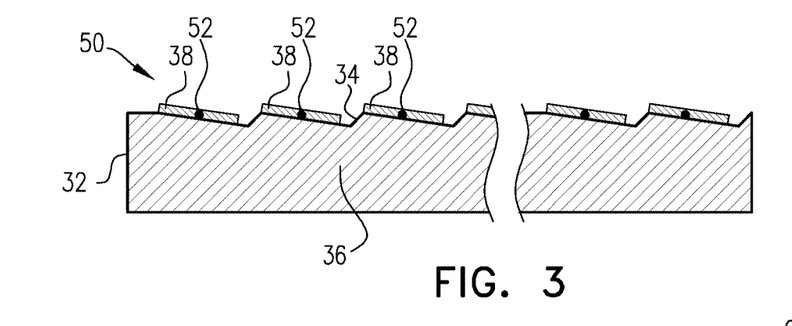
FIGS. 3, 4 and 5 are schematic sectional views of tunable diffraction gratings, in accordance with embodiments of the invention.

FIG. 3 is a schematic sectional view of a tunable diffraction grating 50, in accordance with an embodiment of the invention. Grating 50 can be identical in structure and functionality to device 26, as described above, and is shown here to illustrate the location of axes 52 of rotation, which run along the respective centerlines of plates 38. This axis position is advantageous in that the liquid 36 that is displaced by the downward motion of the right sides of the plates is taken up in the additional space created by the upward motion of the left sides of the plates. Thus, the total liquid volume is conserved, and the only resistance to the rotation of plates 38 is due to the viscosity of liquid 36 and the elasticity of membrane 34. Therefore, only minimal actuation force is required in order to rotate the plates.

Figure 4:
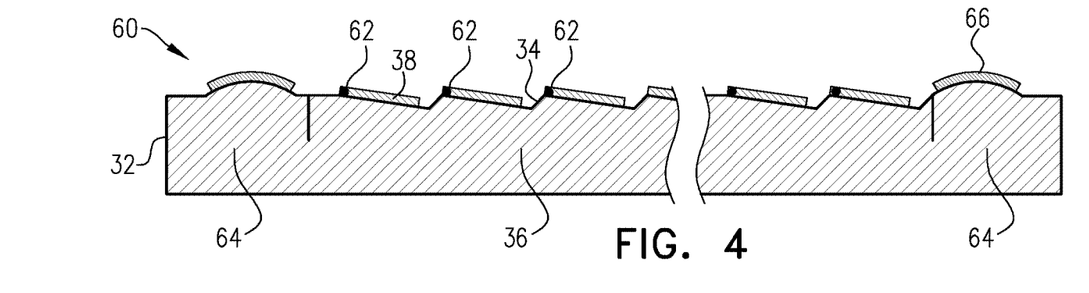

FIG. 4 is a schematic sectional view of a tunable diffraction grating 60, in accordance with another embodiment of the invention. Grating 60 can also be similar in structure and functionality to device 26, as described above, but in this case axes 62 of rotation are located along the respective edges of plates 38. As a result, rotation of plates 38 about axes 62 reduces the available volume for liquid 36 in the area beneath the plates. To alleviate this problem, one or more reservoirs 64 receive the liquid that is displaced as plates 38 rotate downward and then expel this liquid when the plates rotate back up to their rest position. Membrane 34 over reservoirs 64 expands and contracts depending on the amount of liquid displaced into the reservoirs. Although reservoirs 64 in FIG. 4 are located outside the area of the array of plates 38, the gaps between an alongside plates 38 may be used, additionally or alternatively, as reservoir areas.

In the pictured embodiment, grating 60 comprises piezoelectric actuators 66, which are fixed to membrane 34 over reservoirs 64. Actuators 66 are driven to bend, as shown in FIG. 4, in order to draw liquid into reservoirs 64 when plates 38 rotate downward, and to straighten in order to expel the liquid from the reservoirs when the plates rotate back up. Actuators 66 thus function as a pump, which can assist in reducing the force that must be exerted in order to rotate plates 38 (and may even obviate the need to apply force directly to the plates themselves). This sort of pump can also be useful in adjusting for changes in the volume of liquid 36 due to thermal expansion and contraction. Alternatively, other sorts of miniature pumping mechanisms may be applied for these purposes.

Figure 5:
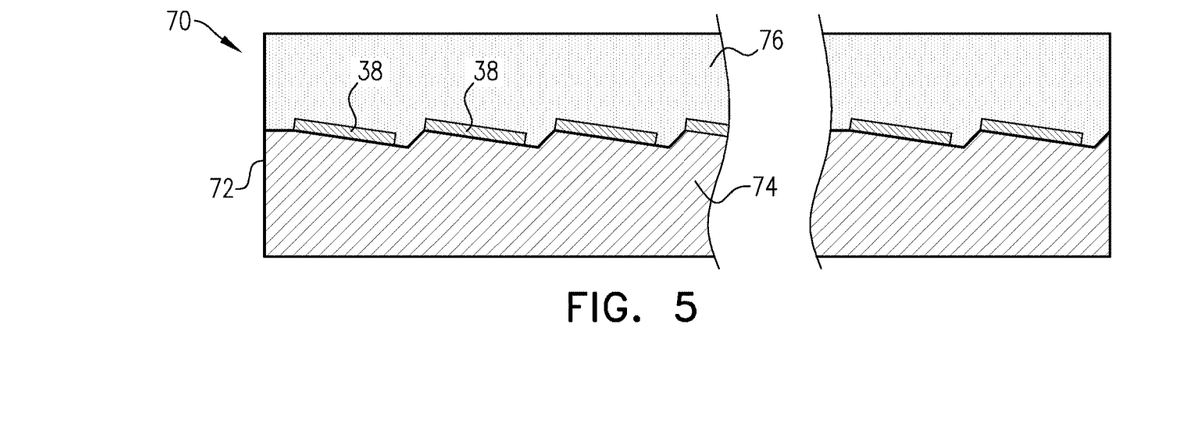

FIG. 5 is a schematic sectional view of a tunable diffraction grating 70, in accordance with an alternative embodiment of the invention. The principle of operation of grating 70 is similar to that of device 26, but in this embodiment there is no membrane covering the liquid. Rather, grating 70 comprises two immiscible liquids 74 and 76 inside a closed case 72. Plates 38 are disposed directly over the surface of liquid 74, which is assumed to be heavier than liquid 76. For example, liquids 74 and 76 may comprise two different optical oils, with different refractive indexes. (The larger the difference in refractive index, the smaller will be the required rotation of plates 38 in order to switch between diffraction orders.)

This embodiment is advantageous in reducing the force that must be applied in order to rotate plates 38, since mechanical resistance due to the elasticity of the membrane used in the preceding embodiments is eliminated. In another embodiment, liquid 76 is replaced by a gas, such as air.

Figure 6:
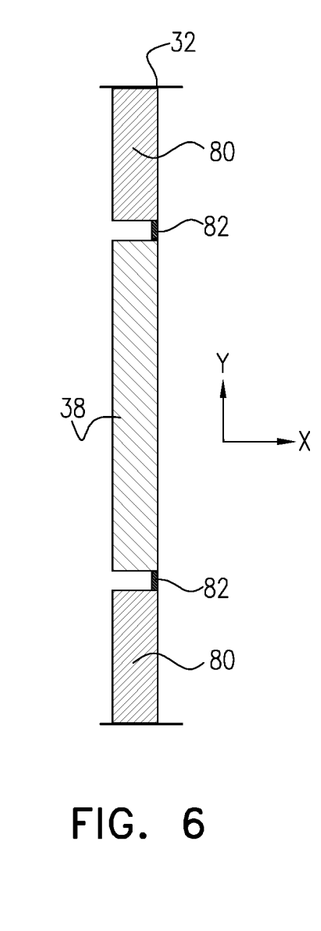
FIGS. 6 and 7 are schematic frontal views of plates in tunable diffraction gratings with piezoelectric actuators, in accordance with embodiments of the invention.
Figure 7:
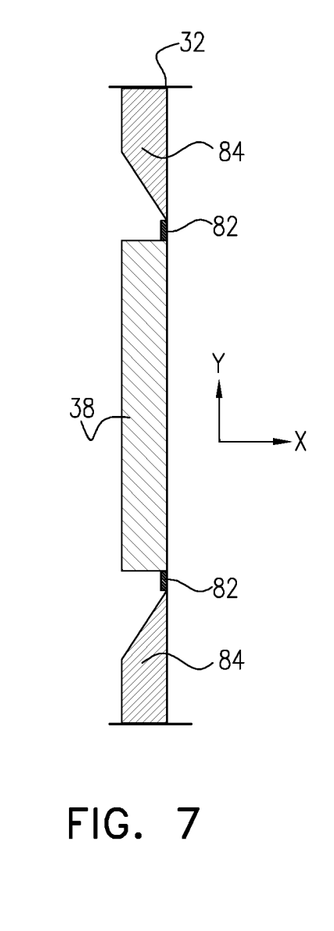

FIGS. 6 and 7 are schematic frontal views of plates in tunable diffraction gratings with piezoelectric actuators 80 and 84, respectively, in accordance with embodiments of the invention. These figures show individual plates 38 within an array in a deflection device, such as device 26 in FIG. 2C. The structures shown in these and the succeeding figures may be produced, for example, by processes of thin film deposition, photolithographic patterning, and etching, as are known in the art of fabrication of semiconductor devices and microelectromechanical systems (MEMS).

Actuators 80 and 84 comprise piezoelectric beams, which are oriented along the respective axes of plates 38 and are coupled by mechanical connectors 82 to apply rotational forces to the edges of plates 38. Actuators 80 are rectangular, while actuators 84 are trapezoidal, for example, but other geometrical configurations may alternatively be used. In one embodiment, these actuators comprise a layer of lead zirconate titanate (PZT) deposited on a silicon substrate. To deflect plates 38 downward (in the –Z direction in the view shown in FIGS. 6 and 7), actuators 80 and 82 are disposed with the PZT layer below the silicon layer.

Figure 8:
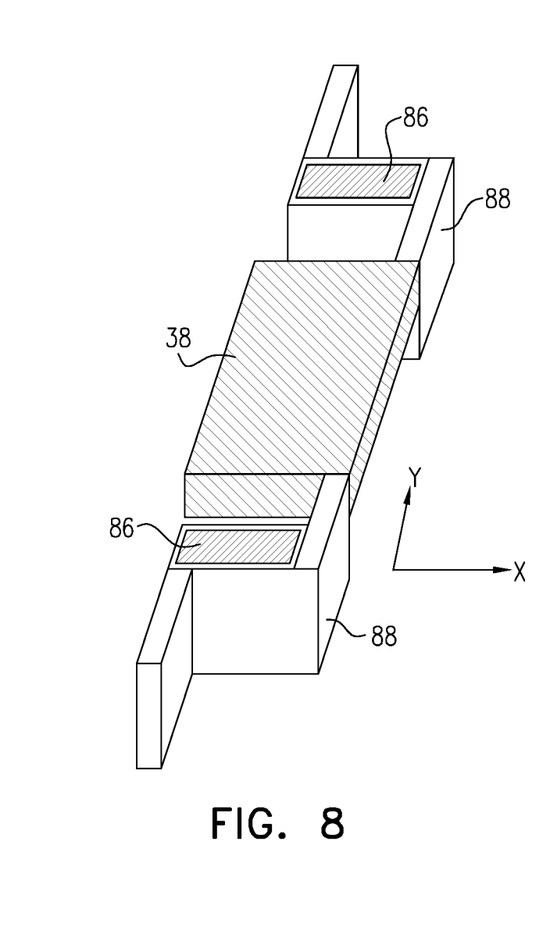
FIG. 8 is a schematic pictorial view of a plate in a tunable diffraction grating with piezoelectric actuators, in accordance with another embodiment of the invention.

FIG. 8 is a schematic pictorial view of plate 38 in a tunable diffraction grating, with piezoelectric actuators 86 in accordance with another embodiment of the invention. In this case, actuators 86 comprise piezoelectric beams that are oriented perpendicular to the axis of plate 38 and are coupled by mechanical connectors 88 to apply rotational forces to the edge of the plate. Because the piezoelectric beams are short in this case, they can achieve only a limited range of motion. To increase the range of motion, two or more beams can be arranged in serpentine fashion at each side of plate 38.

Figure 9A:
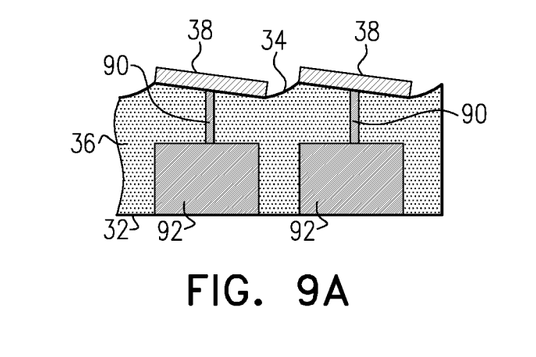
FIGS. 9A and 9B are schematic sectional and frontal views, respectively, of plates in a tunable diffraction grating with hinges, in accordance with an embodiment of the invention.
Figure 9B:
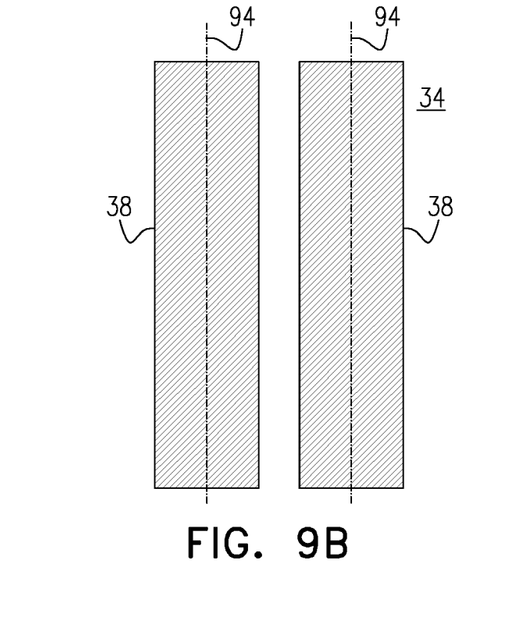

FIGS. 9A and 9B are schematic sectional and frontal views, respectively, of plates 38 in a tunable diffraction grating, with hinges 90 in accordance with an embodiment of the invention. Hinges 90 secure plates 38 to anchors 92 in case 32 at points along respective axes 94 of rotation of the plates. In this example, axes 94 are located along the centerlines of plates 38. Hinges 90 extend downward through fluid 36 to anchors 92, in a direction perpendicular to axes 94. Hinges 90 and anchors 92 (as well as the hinges and anchors in the embodiments that follow) can be produced together with case 32, for example using a process of photolithography and etching, and then bonded to membrane 34 and plates 38.

Figure 10A:
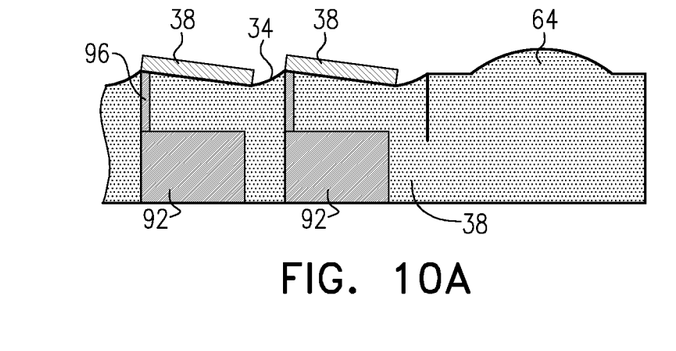
FIGS. 10A and 10B are schematic sectional and frontal views, respectively, of plates in a tunable diffraction grating with hinges, in accordance with another embodiment of the invention.
Figure 10B:
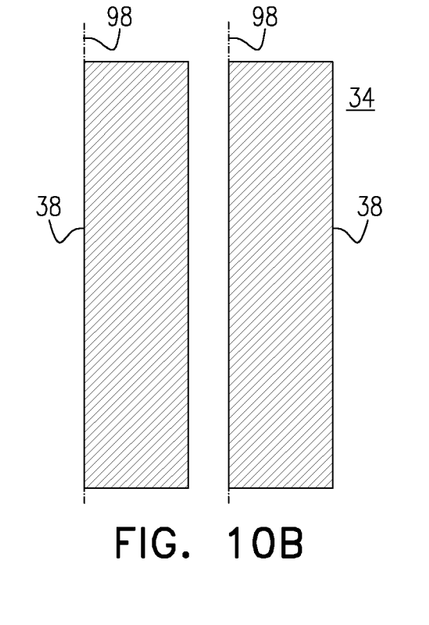

FIGS. 10A and 10B are schematic sectional and frontal views, respectively, of plates 38 in a tunable diffraction grating, with hinges 96 in accordance with another embodiment of the invention. As in the preceding embodiment, hinges 96 secure plates 38 to anchors 92 in case 32 at points along respective axes 98 of rotation of the plates; but in this case axes 98 are located along the edges of plates 38.

Figure 11A:
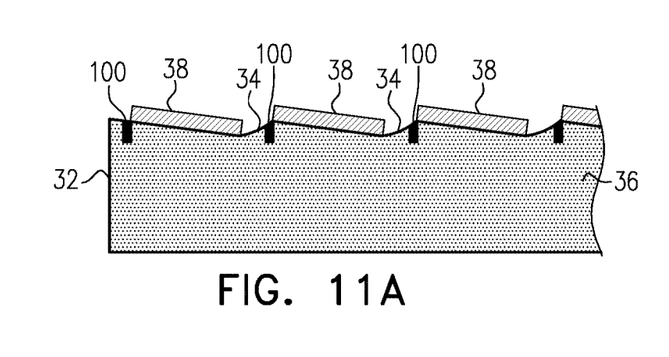
FIGS. 11A and 11B are schematic sectional and frontal views, respectively, of plates in a tunable diffraction grating with hinges, in accordance with yet another embodiment of the invention.
Figure 11B:
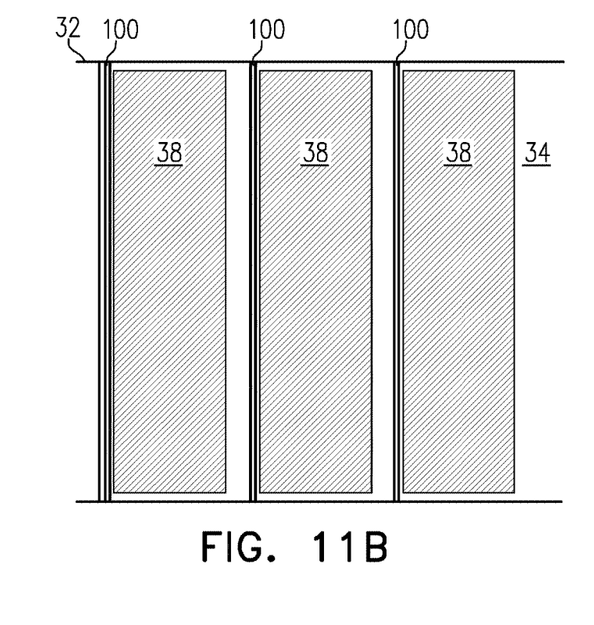

FIGS. 11A and 11B are schematic sectional and frontal views, respectively, of plates 38 in a tunable diffraction grating, with hinges 100 in accordance with yet another embodiment of the invention. In this example, hinges 100 extend in a direction parallel to the axes of plates 38 and are anchored to the edges of case 32, rather than to the bottom. Hinges 100 (as well as the hinges in the embodiment of FIGS. 12A/B) can be produced on membrane 34 by processes of thin film deposition, photolithography, and etching, for example, or by a nanoimprint process. Hinges 100 support membrane 34 along respective lines that are parallel to plates 38, and thus secure plates 38 to case 32 without actually being attached directly to the plates. This arrangement allows the plates greater freedom of motion over liquid 36.

Figure 12A:
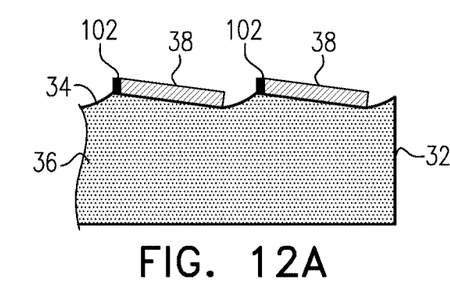
FIGS. 12A and 12B are schematic sectional and frontal views, respectively, of plates in a tunable diffraction grating with hinges, in accordance with a further embodiment of the invention.
Figure 12B:
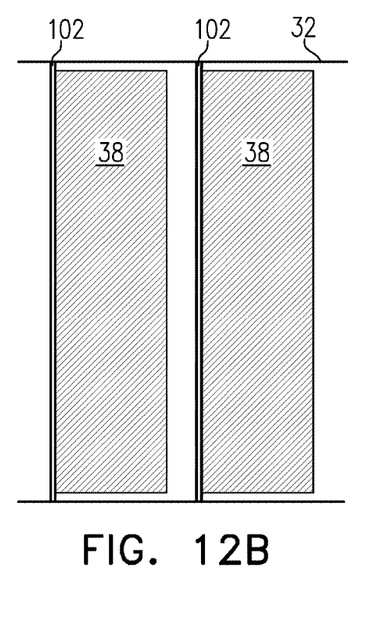

FIGS. 12A and 12B are schematic sectional and frontal views, respectively, of plates 38 in a tunable diffraction grating, with hinges 102 in accordance with a further embodiment of the invention. In this example, hinges 102 are attached along the edges of plates 38 above membrane 34, and thus secure the plates to the edges of case 32.

Figure 13:
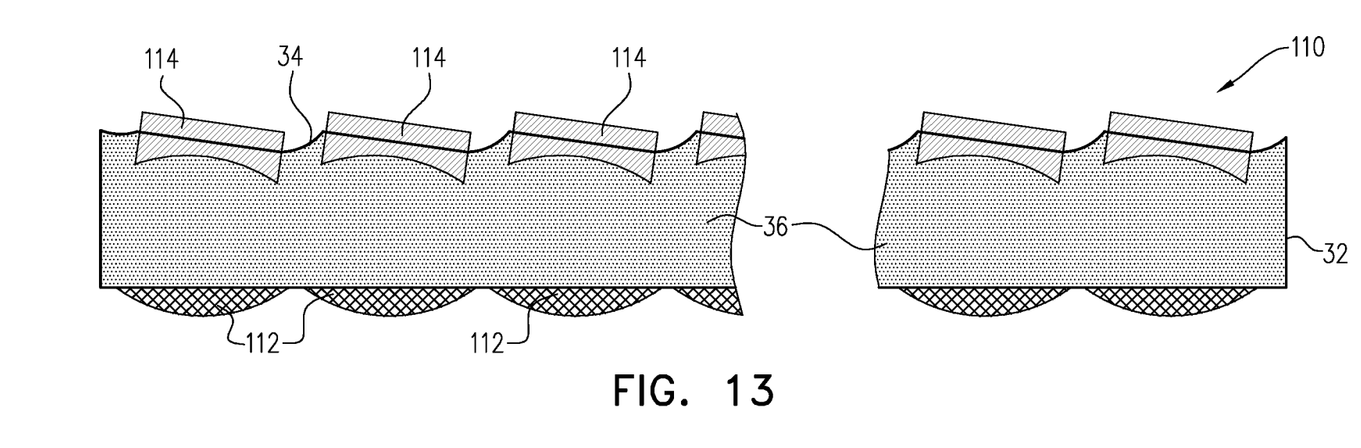
FIG. 13 is a schematic sectional view of a tunable diffraction grating with integral microlenses, in accordance with an embodiment of the invention.

FIG. 13 is a schematic sectional view of a tunable diffraction grating 110 with integral microlenses 112, in accordance with an embodiment of the invention. This embodiment addresses the problem that a portion of the light beam that is incident on the grating can pass through the gaps between plates 114 and thus reduce the efficiency of deflection. It is assumed in this embodiment that beam (FIG. 1) is incident on and transmitted through the lower surface of case 32. An array of cylindrical microlenses 112 is fixed to case in alignment with plates 114 and with the same pitch as the plates. Microlenses 112 focus the incident light sufficiently so that nearly all the light energy is directed toward the areas of the plates and not the intervening gaps. Plates 114 have the form of diverging cylindrical lenses, which are complementary to microlenses 112 so that the diffracted light transmitted through grating 110 is collimated.

Figure 14:
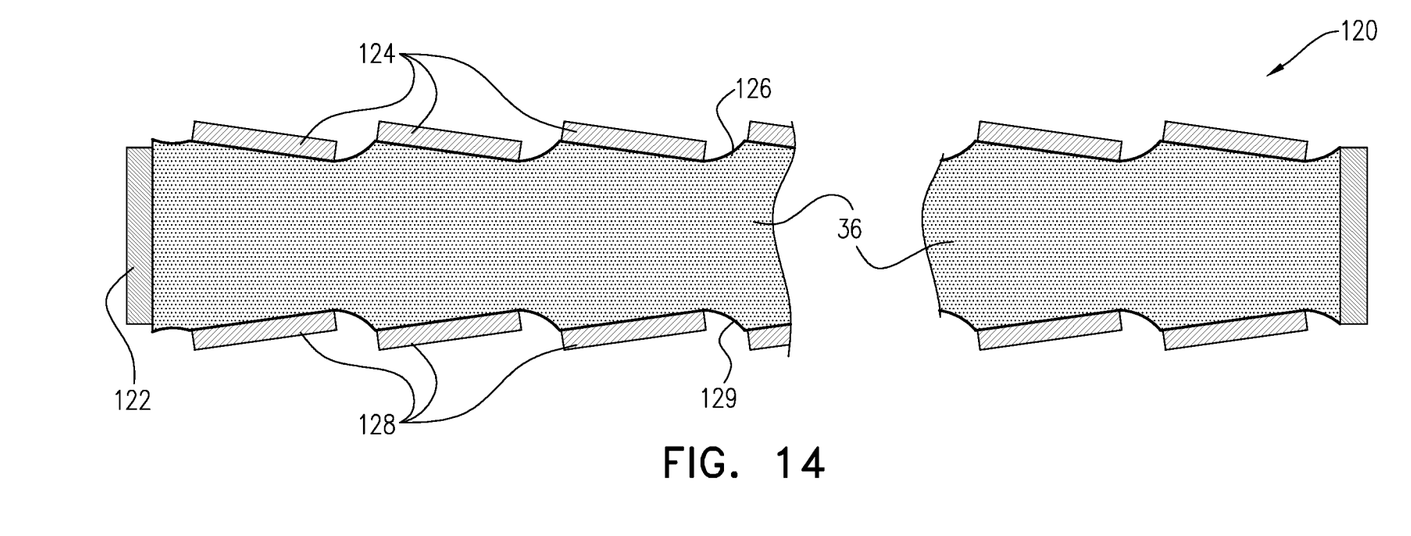
FIG. 14 is a schematic sectional view of a tunable diffraction grating, in accordance with a further embodiment of the invention.

FIG. 14 is a schematic sectional view of a tunable diffraction grating 120, in accordance with a further embodiment of the invention. In this embodiment, case 122 is covered by transparent membranes 126 and 129 on the opposing upper and lower sides of liquid 36. (The terms "upper" and "lower" are used here solely for the sake of convenience, since grating 120 can be used in substantially any desired orientation.) An array of transparent plates 124 is fixed to membrane 126, while another array of transparent plates 128 is fixed to membrane 129. The axes of rotation of plates 124 and 128 are mutually parallel. In the pictured embodiment, plates 128 rotate in the opposite angular direction to plates 124, thus increasing the effective blaze angle of grating 120. Alternatively, the plates may be actuated to rotate in the same direction. In the rest position (as illustrated in FIG. 2A, for example), plates 124 are all coplanar, as are plates 128.

Figure 15A:
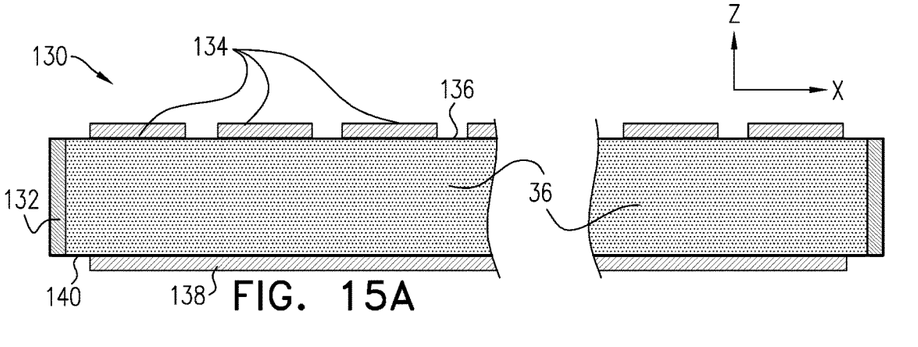
FIG. 15A is a schematic sectional view of a tunable diffraction grating, in accordance with yet another embodiment of the invention.
Figure 15B:
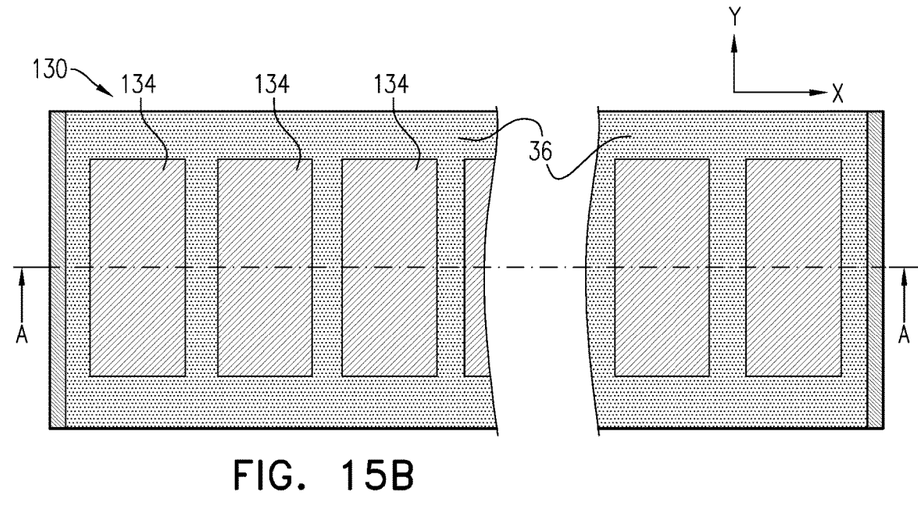
FIGS. 15B and 15C are schematic top and bottom views, respectively, of the tunable diffraction grating of FIG. 15A.
Figure 15C:
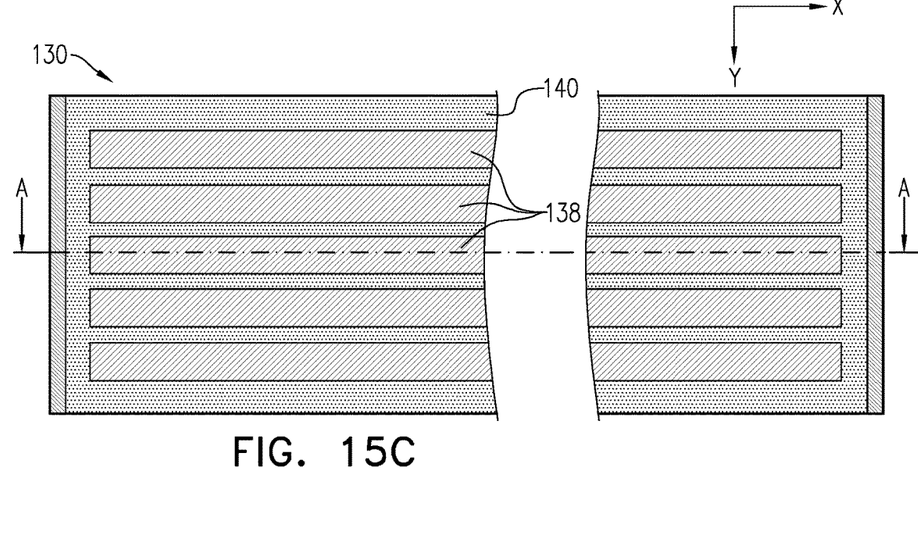

Reference is now made to FIGS. 15A-C, which schematically illustrate a tunable diffraction grating 130, in accordance with yet another embodiment of the invention. FIG. 15A is a sectional view, while FIGS. 15B and 15C are top and bottom views, respectively, of the tunable diffraction grating.

As in the preceding embodiment, grating 130 comprises a case 132, with membranes 136 and 140 on the opposing upper and lower sides of liquid 36. An array of transparent plates 134 is fixed to membrane 136, while another array of transparent plates 138 is fixed to membrane 140. (The plates in these figures are shown in their rest positions.) In contrast to the preceding embodiment, however, the axes of rotation of plates 138 are oriented along the X-axis, perpendicular to those of plates 134, which are oriented along the Y-axis. This configuration makes it possible for grating 130 to deflect an incident beam in either the X-direction or the Y-direction or both, depending on the respective angles of plates 134 and 138.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Apparatus for deflection of a beam of light, the apparatus comprising:
    a case, which is configured to be positioned in a path of the beam;
    a liquid, which is contained within the case;
    an array of plates, which are disposed across a surface of the liquid and are configured to rotate on the surface about respective axes, which are mutually parallel and are spaced apart by a predefined pitch; and
    an actuator, which is configured to drive a rotation of the plates about the respective axes so as deflect the beam that is incident on the plates.

2. The apparatus according to claim 1, wherein the case, the liquid, and the plates are transparent to the light, and the beam is deflected upon transmission through the apparatus.

3. The apparatus according to claim 2, and comprising cylindrical microlenses, which are fixed to the case in alignment with the plates.

4. The apparatus according to claim 1, wherein the beam is deflected by reflection from the plates.

5. The apparatus according to claim 1, wherein the array is configured to diffract the incident beam into a plurality of diffraction orders, having an angular spacing between the orders that is dependent on a ratio of a wavelength of the light to the pitch of the array, and wherein the actuator is configured to rotate the plates among a set of two or more blaze angles selected to direct the deflected light respectively into two or more different ones of the diffraction orders.

6. The apparatus according to claim 5, wherein the two or more of the diffraction orders comprise a zero diffraction order and a first diffraction order.

7. The apparatus according to claim 1, wherein the liquid comprises an oil.

8. The apparatus according to claim 7, wherein the oil across which the plates are disposed is a first liquid having a first refractive index, and wherein the apparatus further comprises a second liquid, which is immiscible with the oil and has a second refractive index different from the first refractive index, and which is disposed within the case over the array of plates.

9. The apparatus according to claim 1, and comprising a flexible membrane covering the surface of the liquid, wherein the plates are disposed on the flexible membrane, which is deformed by the rotation of the plates.

10. The apparatus according to claim 9, wherein the case comprises a reservoir having a volume that varies with the rotation of the plates so as to receive and expel the liquid that is displaced by deformation of the flexible membrane.

11. The apparatus according to claim 10, and comprising a pump, which is configured to draw the liquid into the reservoir and drive the liquid out of the reservoir in conjunction with the rotation of the plates.

12. The apparatus according to claim 1, wherein the axes about which the plates rotate are disposed along respective edges of the plates.

13. The apparatus according to claim 1, wherein the axes about which the plates rotate are disposed along respective centerlines of the plates.

14. The apparatus according to claim 1, and comprising a plurality of hinges, which secure the plates to the case at points along the respective axes of the plates.

15. The apparatus according to claim 1, wherein the actuator comprises a plurality of piezoelectric beams, which are coupled to apply rotational forces to the plates.

16. The apparatus according to claim 15, wherein the piezoelectric beams are oriented along the respective axes of the plates.

17. The apparatus according to claim 15, wherein the piezoelectric beams are oriented perpendicular to the respective axes of the plates.

18. The apparatus according to claim 1, wherein the array of plates comprises a first array of the plates, which are disposed across a first surface of the liquid and are configured to rotate about respective first axes, and wherein the apparatus comprises a second array of the plates, which are disposed across a second surface of the liquid, opposite the first surface, and are configured to rotate about respective second axes, which are mutually parallel.

19. The apparatus according to claim 18, wherein the second axes are parallel to the first axes.

20. The apparatus according to claim 18, wherein the second axes are perpendicular to the first axes.

* * * * *